US006983560B2

(12) United States Patent        (10) Patent No.:    US 6,983,560 B2
Williams                                            (45) Date of Patent:     Jan. 10, 2006

(54) FISHING ACCESSORY APPARATUS

(76) Inventor: Charles H. Williams, 500 Old Sharpsville Rd., Harrodsburg, KY (US) 40330

( * ) Notice: Subject to any disclaimer, the term of this patent is extended or adjusted under 35 U.S.C. 154(b) by 0 days.

(21) Appl. No.: 10/715,676

(22) Filed: Nov. 18, 2003

(65)             Prior Publication Data

US 2005/0102882 A1     May 19, 2005

(51) Int. Cl.
      *A01K 97/10*        (2006.01)
(52) U.S. Cl. ........................ 43/21.2; 248/512; 248/515; 248/519; 248/528; 248/529
(58) Field of Classification Search ................... 43/17, 43/21.2, 54.1; 280/654, 655, 659; 16/429; 248/511, 512, 514, 515, 519, 520, 528, 529; 206/315.11; 224/920, 922; 211/70.8
See application file for complete search history.

(56)              References Cited

U.S. PATENT DOCUMENTS

| | | | | |
|---|---|---|---|---|
| 440,727 | A | * | 11/1890 | Sheafe ........................ 248/520 |
| D136,856 | S | * | 12/1943 | Olowecki ................... 43/21.2 |
| 2,442,357 | A | * | 6/1948 | Hamman .................... 248/515 |
| 2,869,814 | A | * | 1/1959 | Hurlimann .................. 248/520 |
| 2,899,155 | A | * | 8/1959 | Rogers ........................ 43/21.2 |
| 2,949,269 | A | * | 8/1960 | Senkichiro .................. 248/515 |
| 2,961,209 | A | * | 11/1960 | Willey ......................... 248/515 |
| 2,973,929 | A | * | 3/1961 | Zawadzki ................... 248/514 |
| 3,359,928 | A | * | 12/1967 | Gamble ...................... 248/514 |
| 3,444,643 | A | * | 5/1969 | Dobbs ......................... 43/21.2 |
| 3,546,805 | A | * | 12/1970 | Schaefer ..................... 43/21.2 |
| 3,595,504 | A | * | 7/1971 | Anderson et al. ........... 248/515 |
| 3,655,155 | A | * | 4/1972 | Taylor ......................... 43/21.2 |
| 3,686,785 | A | * | 8/1972 | Dixon ......................... 43/21.2 |
| 3,701,504 | A | * | 10/1972 | Woods et al. ............... 248/520 |
| 3,780,466 | A | * | 12/1973 | Hadnot ...................... 211/70.8 |
| 3,903,633 | A | * | 9/1975 | Hutcherson ................ 43/21.2 |
| 4,133,131 | A | * | 1/1979 | Davy .......................... 43/21.2 |
| 4,366,640 | A | * | 1/1983 | Clapp .......................... 43/21.2 |
| 4,479,322 | A | * | 10/1984 | Koppel ....................... 43/21.2 |
| 4,523,403 | A | * | 6/1985 | Ivy et al. ..................... 43/21.2 |
| 4,527,349 | A | * | 7/1985 | Emory, Jr. ................... 43/21.2 |
| 4,581,840 | A | * | 4/1986 | Guith, II ..................... 43/21.2 |
| 4,594,805 | A | * | 6/1986 | McClelland ................ 43/21.2 |
| 4,640,038 | A | * | 2/1987 | Jershin ........................ 43/21.2 |
| 4,763,435 | A | * | 8/1988 | Deering ...................... 43/21.2 |
| 4,779,914 | A | * | 10/1988 | Friedline ................... 211/70.8 |
| 4,953,318 | A | * | 9/1990 | Vasseur, Jr. ................. 43/21.2 |
| 4,964,233 | A | * | 10/1990 | Benson et al. .............. 43/21.2 |
| 5,025,584 | A | * | 6/1991 | Butterwick, Sr. ........... 43/21.2 |
| 5,152,494 | A | * | 10/1992 | Frunzar ..................... 43/21.2 |
| 5,203,815 | A | * | 4/1993 | Miller ......................... 43/21.2 |
| 5,228,227 | A | * | 7/1993 | Hodgson, Sr. .............. 43/54.1 |
| 5,257,700 | A | * | 11/1993 | Wallace .................... 211/70.8 |
| 5,345,708 | A | * | 9/1994 | Loyd .......................... 43/21.2 |
| 5,481,822 | A | * | 1/1996 | Engels ........................ 43/54.1 |

(Continued)

FOREIGN PATENT DOCUMENTS

DE           29702185 A1   *   4/1997

(Continued)

*Primary Examiner*—Darren W. Ark
(74) *Attorney, Agent, or Firm*—King & Schickli, PLLC (57)               ABSTRACT

A collapsible fishing accessory apparatus including an accessory support having a plurality of accessory stations and a base. The accessory support collapsibly attaches to the base allowing a user to move the accessory support from a collapsed position to an operational position. Additionally, the fishing accessory apparatus dimensionally adjusts for use in various boat and shore fishing situations.

19 Claims, 7 Drawing Sheets

U.S. PATENT DOCUMENTS

| | | | |
|---|---|---|---|
| 5,520,312 A * | 5/1996 | Maddox | 43/21.2 |
| 5,571,227 A * | 11/1996 | Pisarek | 43/21.2 |
| 5,613,318 A * | 3/1997 | Hislop | 43/21.2 |
| 5,803,519 A * | 9/1998 | Daigle | 211/70.8 |
| 5,904,281 A * | 5/1999 | Mooers | 224/526 |
| 5,913,673 A * | 6/1999 | Womac | 43/54.1 |
| 5,987,804 A * | 11/1999 | Shearer et al. | 43/21.2 |
| 6,014,833 A * | 1/2000 | Benavidez | 43/54.1 |
| 6,082,757 A * | 7/2000 | Lin | 280/654 |
| 6,131,925 A * | 10/2000 | Weldon | 280/30 |
| 6,179,180 B1 * | 1/2001 | Walker | 224/401 |
| 6,189,914 B1 * | 2/2001 | Worth et al. | 280/642 |
| 6,196,513 B1 * | 3/2001 | Edwards et al. | 248/528 |
| 6,203,103 B1 * | 3/2001 | Presson | 297/188.01 |
| 6,289,627 B1 * | 9/2001 | Gibbs et al. | 43/21.2 |
| 6,302,412 B1 * | 10/2001 | Worth et al. | 280/30 |
| 6,341,443 B1 * | 1/2002 | Watford et al. | 43/17 |
| 6,360,902 B1 * | 3/2002 | Searles | 211/70.8 |
| 6,405,478 B1 * | 6/2002 | Westley | 43/54.1 |
| 6,427,376 B1 * | 8/2002 | Weber | 43/21.2 |
| 6,453,598 B1 * | 9/2002 | Robertson | 43/21.2 |
| 6,474,097 B2 * | 11/2002 | Treppedi et al. | 62/457.7 |
| 6,550,791 B2 * | 4/2003 | Ramsey | 280/47.19 |
| 6,651,374 B1 * | 11/2003 | Ridlen | 43/21.2 |
| 6,678,991 B2 * | 1/2004 | Hooks et al. | 43/21.2 |
| 6,681,517 B1 * | 1/2004 | Solomon | 43/21.2 |
| 6,684,555 B1 * | 2/2004 | Vela | 43/15 |
| 6,698,830 B1 * | 3/2004 | Gaines | 297/188.11 |
| 6,729,066 B1 * | 5/2004 | Howley | 43/54.1 |
| 6,862,835 B1 * | 3/2005 | Connors et al. | 43/21.2 |
| 6,883,267 B1 * | 4/2005 | Pruitt | 43/21.2 |
| 2005/0178041 A1 * | 8/2005 | Zaffiro | 43/21.2 |

FOREIGN PATENT DOCUMENTS

| | | | |
|---|---|---|---|
| DE | 10309295 A1 * | 9/2004 | |
| FR | 2447145 A1 * | 9/1980 | |
| FR | 2539583 A1 * | 7/1984 | |
| FR | 2539584 A1 * | 7/1984 | |
| FR | 2576487 A1 * | 8/1986 | |
| FR | 2683200 A1 * | 5/1993 | |
| FR | 2777252 A1 * | 10/1999 | |
| FR | 2784265 A1 * | 4/2000 | |
| GB | 2318715 A1 * | 5/1998 | |
| GB | 2321580 A1 * | 8/1998 | |
| GB | 2385250 A1 * | 8/2003 | |
| GB | 2399482 A1 * | 9/2004 | |
| JP | 2-13339 B1 * | 1/1990 | |
| JP | 5-153890 B1 * | 6/1993 | |
| JP | 6-105638 B1 * | 4/1994 | |
| JP | 7-289136 B1 * | 11/1995 | |
| JP | 8-196182 B1 * | 8/1996 | |
| JP | 9-252696 B1 * | 9/1997 | |
| JP | 10-108604 B1 * | 4/1998 | |
| JP | 11-69935 B1 * | 3/1999 | |
| JP | 2000-23608 B1 * | 1/2000 | |
| JP | 2000-350544 B1 * | 12/2000 | |
| JP | 2001-95452 B1 * | 4/2001 | |
| JP | 2001-224292 B1 * | 8/2001 | |
| JP | 2001-292676 B1 * | 10/2001 | |
| JP | 2003-204748 B1 * | 7/2003 | |
| JP | 2004-121005 B1 * | 4/2004 | |

* cited by examiner

FISHING ACCESSORY APPARATUS

TECHNICAL FIELD

The present invention relates generally to fishing accessories and, more specifically, to a collapsible fishing accessory apparatus.

BACKGROUND OF THE INVENTION

Recreational fishing has become one of the most popular outdoor leisure time activities. Many individuals from various age groups and socio-economic backgrounds participate in fishing. Due to the widespread interest in recreational fishing, many products have been developed to make fishing more productive and enjoyable. Some of the more popular products include fishing rod and fishing accessory holders.

Problematically, many of these fishing rod and fishing accessory holders do not provide for receiving multiple fishing rods or other items, such as cups, pliers, bait, or other accessories. Additionally, many of these accessory holders support only one fishing rod or can only be used specifically with a boat or specifically on land. For example, some of these accessory holders require special mounting brackets for use on a boat requiring a user to drill holes or permanently affix the accessory holder to the boat. This is a time consuming process which is destructive to the boat.

Furthermore, many of these accessory holders do not provide for collapsible storage. When not in use, the non-collapsible accessory holders waste valuable space on a boat. Additionally, land transportation and use of the non-collapsible accessory holders is cumbersome.

Also, these accessory holders do not permit dimensional adjustment. When fishing from land or a boat, adjustments to the height, width, and depth of the accessory holder may be desired to compensate for the boat floor plan, shore terrain, or fishing style. Many of these accessory holders are rigid and do not allow for user customized height, width, and depth adjustment. The rigidity of these accessory holders also do not allow a user to optimally position multiple fishing rods when fishing or trolling several lures from a moving boat.

Accordingly, the fishing accessory arts have need of a collapsible fishing accessory apparatus that provides support for multiple fishing accessories. Furthermore, the need exists for a fishing accessory apparatus that allows for dimensional adjustment.

SUMMARY OF THE INVENTION

In accordance with the purposes of the present invention as described herein, a new and improved fishing accessory apparatus is described. The present invention includes fishing accessory apparatus comprising a base and an accessory support including a plurality of accessory stations. The accessory support collapsibly attaches to the base for movement of the accessory support from a collapsed position to an operational position.

In one embodiment, the fishing accessory apparatus includes a base having first and second generally opposed members. An accessory support includes generally opposed first and second supports and at least one transverse support for supporting a plurality of accessory stations. The accessory support collapsibly attaches to the base for movement from a collapsed position to an operational position. This collapsibility provides for more room on a boat when not using the fishing accessory apparatus and makes land transportation more convenient. Movement of an adjuster permits length adjustment to the first, second, and transverse support and the first and second members. This adjustability allows a user to modify the dimensions of the fishing accessory apparatus for optimum use in various boat and shore fishing situations. The accessory support may collapsibly attach to the base via at least one hinge. However, other embodiments include different mechanisms or devices for attaching the accessory support to the base.

The accessory stations may include fishing rod receptacles. The fishing rod receptacles include an aperture for receiving a fishing rod handle, a support region for supporting a fishing rod shaft, and a channel. The fishing rod receptacles adjustably attach to the transverse support via a fastener extending through the channel. Other embodiments include different types of accessory stations for supporting various fishing accessories.

In the following description there is shown and described one possible embodiment of this invention, simply by way of illustration of one of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention.

In the drawings:

FIG. 1b is a detailed view of the adjuster and first member of the fishing accessory apparatus of FIG. 1a;

FIG. 6a is a representative working configuration of the fishing accessory apparatus of FIG. 1a.

DETAILED DESCRIPTION OF THE INVENTION

Figure 1A:
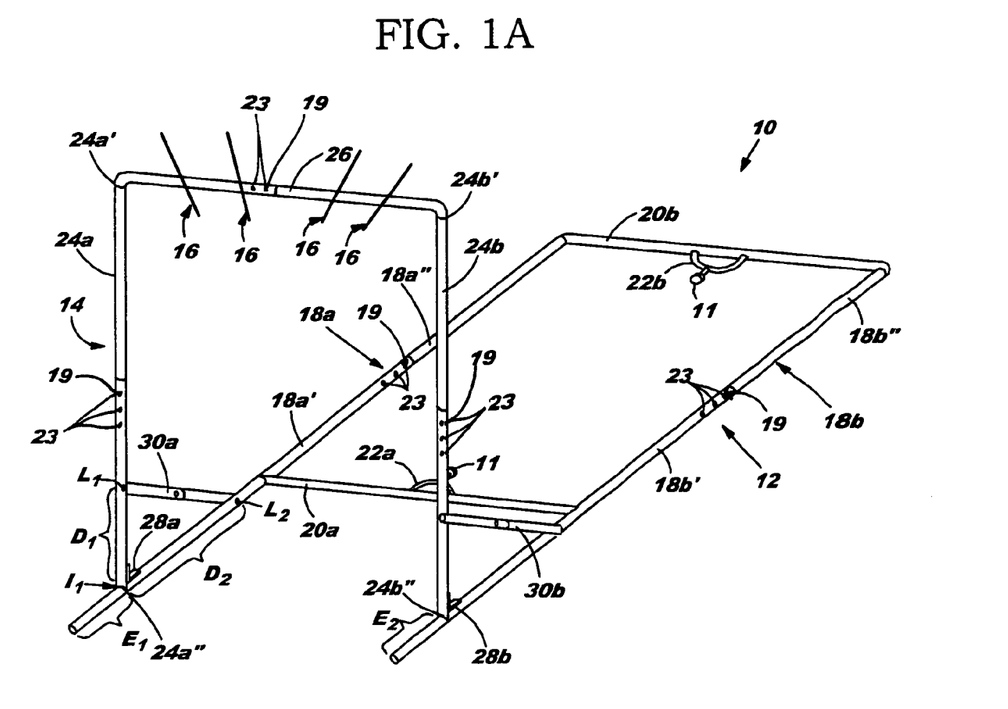
FIG. 1a is a perspective view of the fishing accessory apparatus in accordance with the present invention.

Reference is now made to FIG. 1a illustrating the fishing accessory apparatus 10 of the present invention. As illustrated, the fishing accessory apparatus 10 includes a base 12 and an accessory support 14 attached to the base. The accessory support 14 includes a plurality of accessory stations 16 for receiving fishing accessories.

Figure 1B:
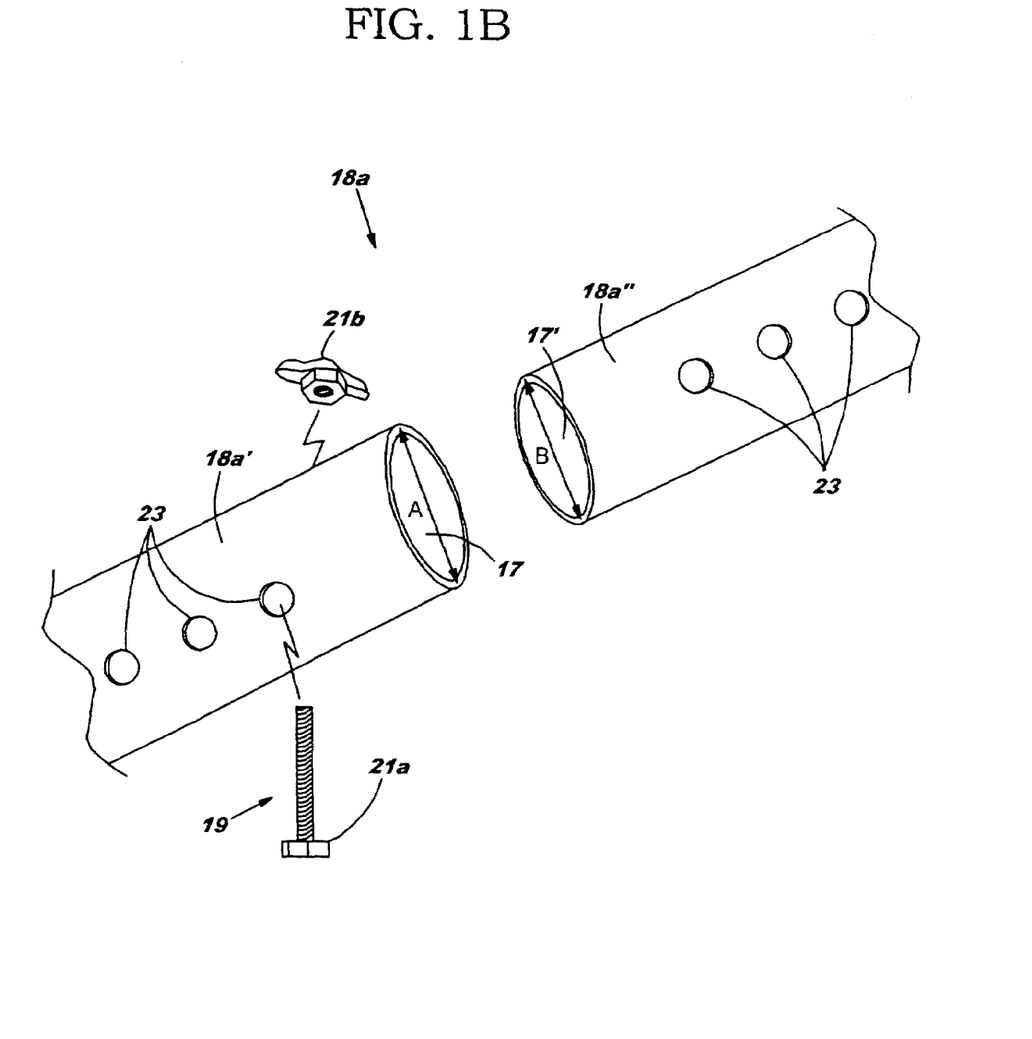

The base 12 includes first and second generally opposed members 18a, 18b. In one embodiment, the first and second members 18a, 18b include an adjuster 19 allowing user adjustment to the length of the first and second members. As seen in FIG. 1b, the adjuster 19 may include a bolt 21a with an accompanying nut 21b. The first and second members 18a, 18b each include a first and second section 18a', 18a", 18b', 18b" each having a plurality of apertures 23 for receiving the adjuster 19 thereby allowing user adjustment to the length of the first and second members. Any of the apertures 23 of each first section 18a', 18b' correspondingly align with any of the apertures 23 of each second section 18a", 18b" of the first and second members 18a, 18b for receiving the adjuster 19. Thus, various combinations of alignment of the apertures 23 between each first section 18a', 18b' and second sections 18a", 18b" allows a user to adjust the length of the first and second members 18a, 18b. As shown in FIG. 1b, the first section 18a' includes an aperture 17 having a dimension A and the second section 18a" has an aperture 17' having a dimension B. Dimension A is greater than dimension B such that 18a" may fit inside section 18a'. Although not shown, first and second sections 18b' and 18b" of the second member 18b have corresponding dimensional relationships. Therefore, adjustment to the length of insertion of the second section 18a" or 18b" inside 18a' or 18b' modifies the overall length of first and second members 18a and 18b. Insertion of the bolt 21a through the apertures 23 of the first and second sections 18a' and 18a" of the first member 18a fixes the length of the first member 18a. Attachment of the accompanying nut 21b secures the bolt 21a in place. Correspondingly, insertion of the bolt 21a through the apertures 23 of the first and second sections 18b' and 18b" of the second member 18b similarly fixes the length of the second member 18b. Alternatively, instead of the adjuster 19 comprising a bolt with an accompanying nut, the adjuster 19 may include a spring loaded mechanism, telescoping friction fit, or any other device, mechanism, or mechanical fastener suitable for permitting user adjustment to the length of the members.

Additionally, the base includes first and second transverse members 20a, 20b attached to and extending in a direction generally perpendicular to the first and second members 18a, 18b. The first and second transverse members 20a, 20b may attach to the first and second members 18a, 18b via welding or mechanical fastener. While not shown, the first and second transverse members 20a, 20b may also include an adjuster 19, as previously described, for allowing user adjustment to the length of the first and second transverse members. While the configuration of first and second members 18a, 18b and first and second transverse members 20a, 20b forms a generally rectangular shape, the base 12 may take the form of any shape that allows for attachment of the accessory support 14. Furthermore, the base 12 may function without the first and second transverse members 20a, 20b altogether. However, using a base with first and second transverse members 20a, 20b promotes stability of the fishing accessory apparatus 10.

Figure 6A:
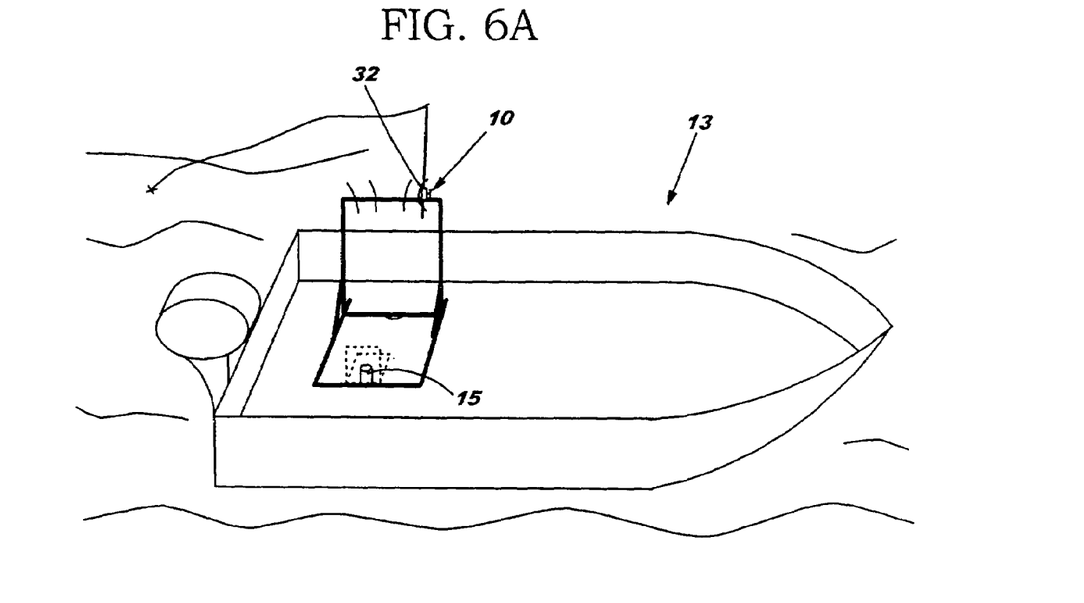

Braces 22a, 22b attach to the first and second transverse members 20a, 20b for securing the base to an auxiliary structure. For example, as shown in FIG. 6a, when using the fishing accessory apparatus 10 on a boat 13, the auxiliary structure may include a pedestal 15 of a seat on the boat. On land the auxiliary structure may include a pillar of a bridge or pier, a member extending from the ground, or any other similar structure that would have a shape and size compatible with the braces 22a, 22b and be suitable for securing the base while using the fishing accessory apparatus. In one embodiment, the braces 22a, 22b comprise curved brackets including a set screw 11. The braces 22a, 22b fixedly attach to the first and second transverse member 20a, 20b by welding or mechanical fasteners, thereby allowing a user to place one or both of the braces 22a, 22b of the base 12 of the fishing accessory apparatus 10 over the auxiliary structure. Tightening of the set screw 11 secures the base 12 to the auxiliary structure. Having multiple braces 22a, 22b allows a user to position and secure the base 12 of the fishing accessory apparatus 10 in various configurations. A user may decide to use both braces 22a, 22b simultaneously or may deem it more advantageous to use only one of the braces. Moreover, the multiple brace configuration allows use of the fishing accessory apparatus 10 in different types of boats having various floor plans and in multiple shore fishing situations. In one embodiment, using a base 12 having only first and second members 18a, 18b, braces 22a, 22b attach to the first and second members 18a, 18b and operate in the manner previously described.

The accessory support includes generally opposed first and second supports 24a, 24b. Additionally, the accessory support includes a transverse support 26 attached to the first and second supports 24a, 24b. In one embodiment, the first support 24a includes a first end 24a' and a second end 24a". Correspondingly, the second support also includes a first end 24b' and a second end 24b". The transverse support 26 attaches generally perpendicular, via welding or mechanical fastener, to the first and second supports 24a, 24b at the first ends 24a', 24b' of the first and second supports 24a, 24b. The accessory support may include more than one transverse support. For instance, the accessory support may include two or more transverse supports for supporting additional accessory stations. The additional transverse supports may attach to the first and second supports 24a, 24b at any point between the first and second ends 24a', 24a", 24b', 24b" of the first and second supports 24a, 24b. As shown in FIG. 1a, the first and second support 24a, 24b and the transverse support 26 may also include an adjuster 19, as previously described, for permitting user adjustment to the length of the supports. In this manner, a user may adjust the height of the fishing accessory apparatus in relation to the floor of a boat or the land on shore.

Figure 2A:
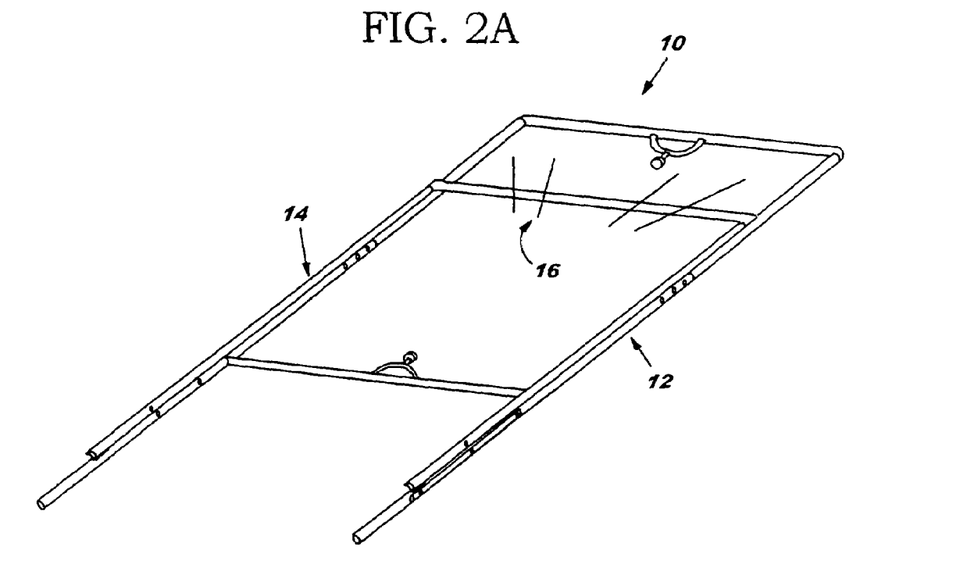
FIG. 2a is the fishing accessory apparatus of FIG. 1a in a collapsed position.
Figure 2B:
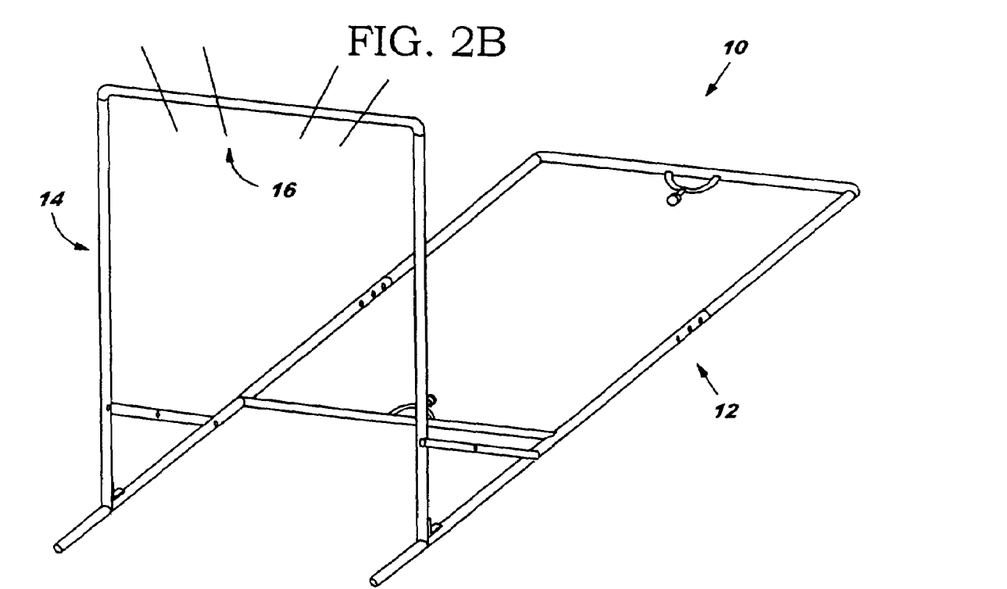
FIG. 2b is the fishing accessory apparatus of FIG. 1a in an operational position.

The accessory support 14 collapsibly attaches to the base thereby allowing movement of the accessory support between a collapsed position (FIG. 2a) to an operational position (FIG. 2b). In one embodiment, the fishing accessory apparatus 10 becomes placed in the collapsed position when the accessory support 14 lies in a plane generally parallel to the base 12. Alternatively, the fishing accessory apparatus 10 becomes placed in the operational position when the accessory support 14 lies in a plane generally perpendicular to the base 12. However, the operational or collapsed position may include placing the accessory support 14 in any planar position not parallel to the base 12 that permits use of the accessory stations.

The accessory support 14 may attach to the base 12 by use of any mechanism, device, or mechanical fastener that allows movement between the collapsed position and the operational position. In one embodiment, the attachment occurs via four hinges. Shown in FIG. 1a, a first hinge 28a attaches to the first support 24a and the first member 18a generally at their point of intersection $I_1$. A second hinge 30a attaches to the first support 24a and the first member 18a at points $L_1$, $L_2$ offset from the intersection $I_1$ of the first support and first member. The distances of offset of the second hinge 30a, shown generally as $D_1$ and $D_2$, assists in stabilizing the accessory support 14 when in the operational position of FIG. 2b. Furthermore, third hinge 28b and fourth hinge 30b attach to the second support 24b and second member 18b in a similar manner. While the accessory support 14 may attach to the base 12 at any point along the first and second members 18a, 18b, one embodiment involves attaching the accessory support 14 to the base 12 such that the first and second members 18a, 18b extend beyond the point of intersection $I_1$ of the accessory support with the base. In this embodiment, the extensions $E_1$, $E_2$ of the first and second members 18a, 18b help provide balance to the fishing accessory apparatus 10 when in use. These extensions stabilize the fishing accessory apparatus 10 from falling over when using the fishing accessory apparatus on a boat or on land.

Figure 3A:
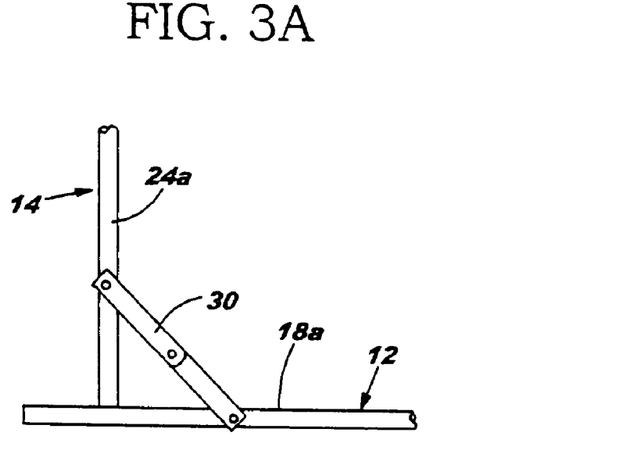
FIGS. 3a, 3b, and 3c are three side views of the fishing accessory apparatus of FIG. 1a illustrating additional alternative embodiments for attachment of the accessory support to the base.
Figure 3B:
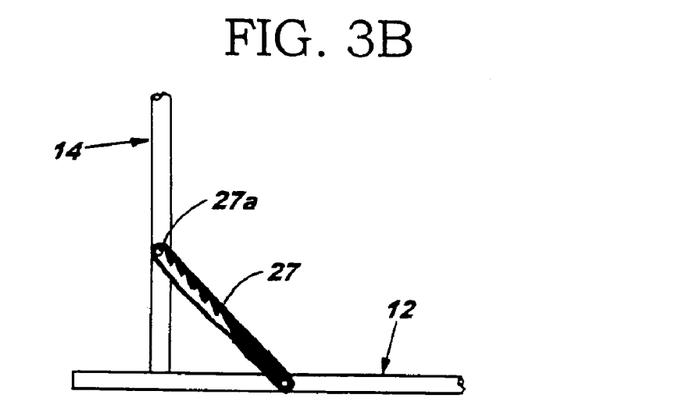
Figure 3C:
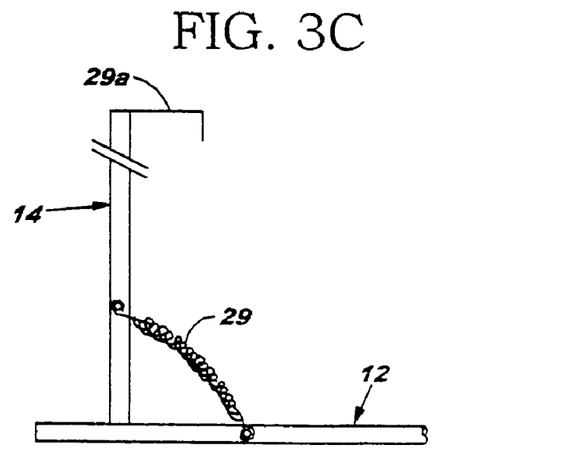

Alternatively, as seen in FIG. 3a, the accessory support 14 may attach to the base 12 by use of only one hinge 30 between the first support 24a and first member 18a, only one hinge between the second support 24b and second member 18b (not shown), or any possible combination of a single hinge or plurality of hinges that would allow movement between the collapsed and operational position. Additionally, as seen in FIGS. 3b and 3c, the attachment may occur via a toothed bracket 27 having a retained pin 27a such that movement of the bracket relative to the retained pin permits movement between the collapsed and operational positions; a spring 29 biased in the operational position and a latch 29a for retaining in the collapsed position; or any other device, mechanism, or mechanical fastener that would allow movement between the collapsed and operational position.

Figure 4A:
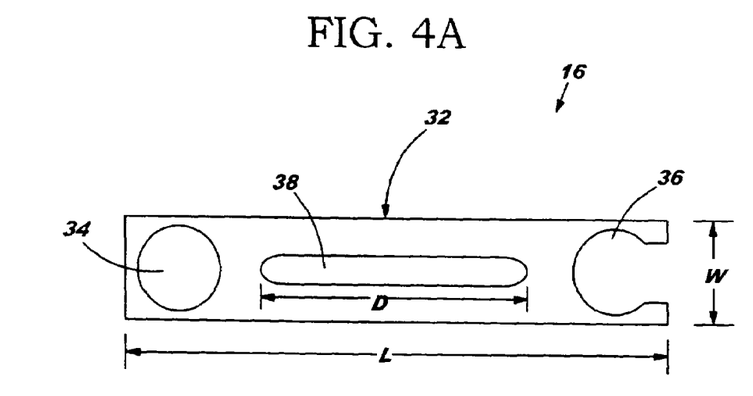
FIG. 4a is a top view of the fishing rod receptacle in accordance with the present invention.
Figure 5A:
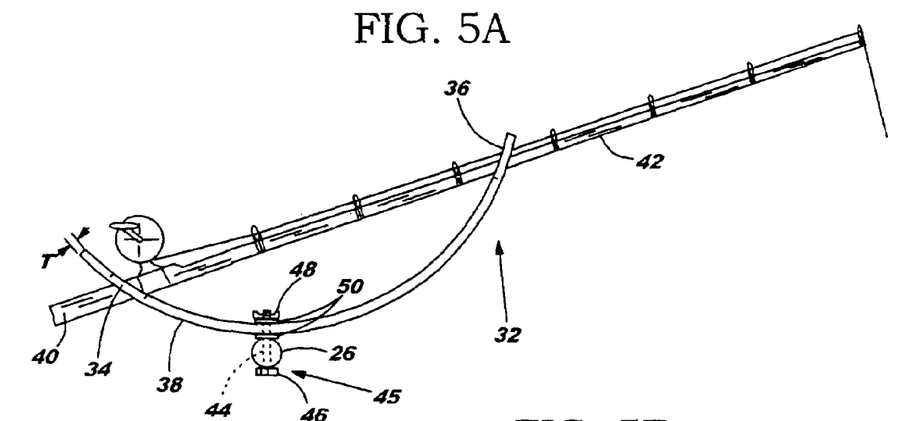
FIG. 5a is a side view of the fishing rod receptacle of FIG. 4a attached to a transverse support, including a representative fishing rod.
Figure 5B:
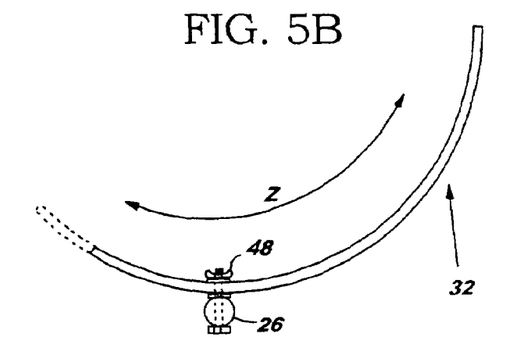
FIG. 5b is a side view of the fishing rod receptacle of FIG. 4a showing attitude adjustment.
Figure 5C:
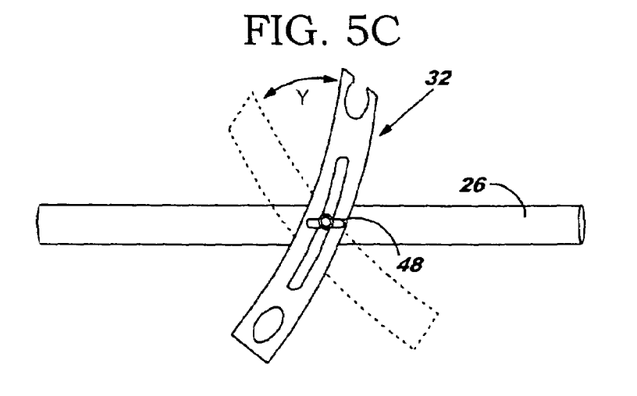
FIG. 5c is a top view of the fishing rod receptacle of FIG. 4a showing lateral adjustment.

Also, the accessory support 14 includes a plurality of accessory stations 16 attached to the transverse support 26. In one embodiment, as seen in FIGS. 4a and 5a, the accessory station 16 may include a fishing rod receptacle 32. The generally curved fishing rod receptacle 32 has a length L, width W, thickness T and comprises an aperture 34 for receiving the handle of a fishing rod 40. The fishing rod receptacle 32 also includes a support region 36 for supporting the shaft of a fishing rod 42. A channel 38 longitudinally extends through the thickness T of the fishing rod receptacle 32 a distance D along the length of the fishing rod receptacle. The fishing rod receptacle adjustably attaches to the transverse support 26 via a fastener 45 extending through the channel 38. In one embodiment, the transverse support 26 includes at least one aperture 44 extending through the transverse support for receiving a bolt 46. Washers 50 and a nut 48 attach to the bolt for securing the fishing rod receptacle to the transverse support 26. Loosening of the nut 48 allows multiple axis adjustability of the fishing rod receptacle 32. As seen in FIG. 5b, after loosening the nut 48 a user may slide the fishing rod receptacle 32 along the channel in a direction generally shown as Z thereby adjusting the attitude of the fishing rod receptacle with respect to the transverse support 26. Additionally, as seen in FIG. 5c, user may laterally adjust the fishing rod receptacle 26 in a direction generally shown as Y. Tightening the nut 48 after positioning the fishing rod receptacle 32 fixes the fishing rod receptacle in place. Therefore, by loosening the nut 48, positioning the fishing rod receptacle 32, and tightening the nut, a user may universally adjust the position the fishing rod receptacle 32, thereby optimizing the angle of the fishing rod for the current fishing situation.

Figure 6B:
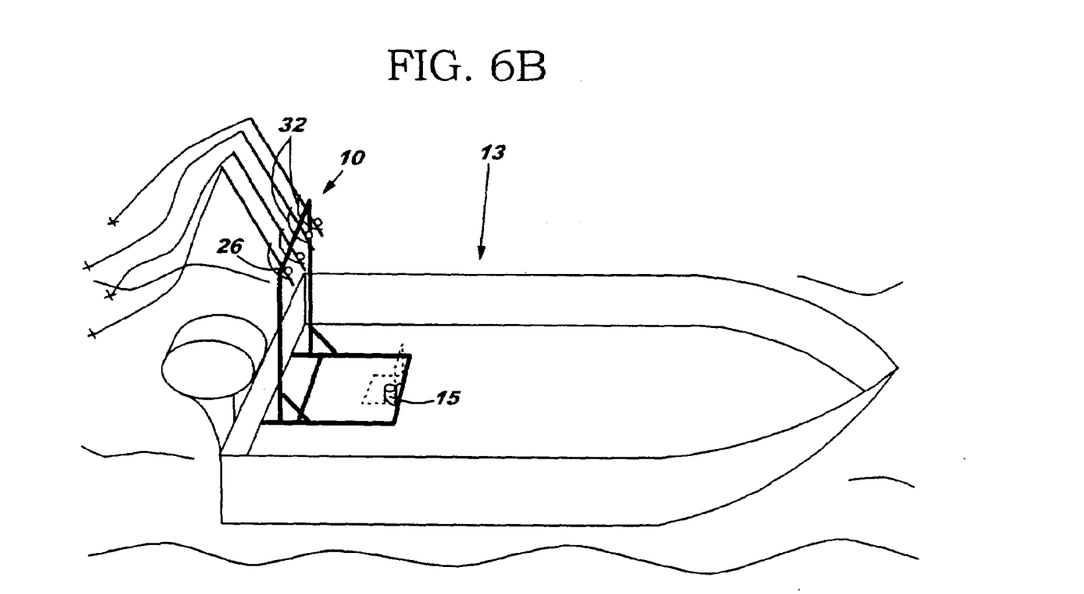
FIG. 6b is a representative working configuration of the fishing accessory apparatus of FIG. 1a showing trolling.

For instance, a user who wishes to trail several fishing lures through the water from a slowly moving boat, commonly known as trolling representatively shown in FIG. 6b, may position a plurality of fishing rod receptacles 32 at various positions along the transverse member 26 and, via adjustment to the nut 48, at various angles. These adjustments to the angle and location of the fishing rod receptacles assist the user by decreasing tangled fishing lines and allows the user to present the fishing lure in any method desired. Furthermore, if a user wishes to drift fish from a boat or fish from shore, the user may position the fishing rod receptacles 32 at the position most advantageous for the current fishing situation.

Figure 4B:
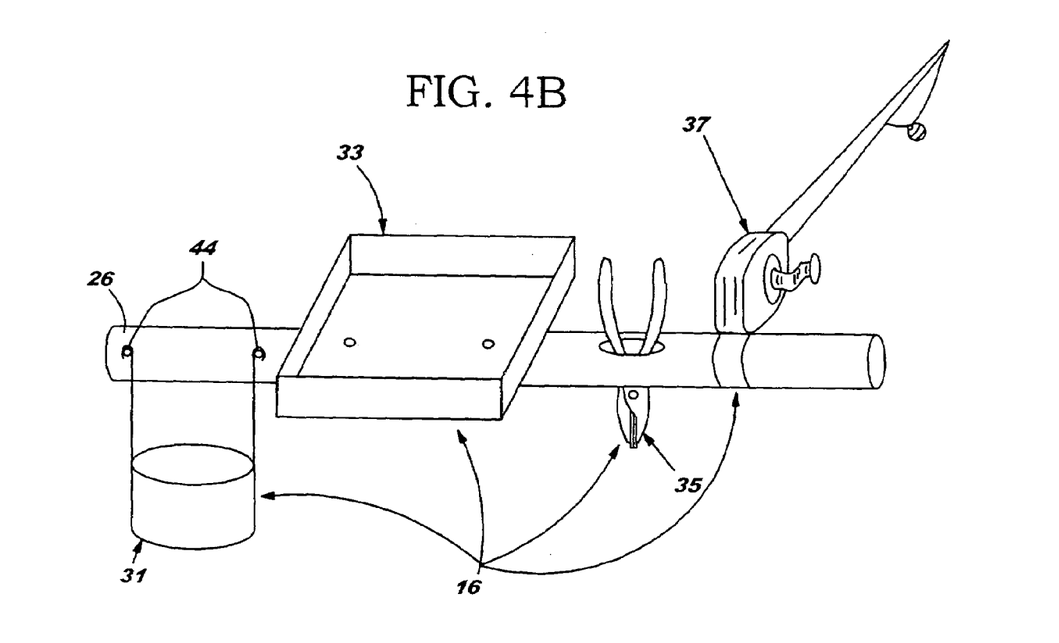
FIG. 4b is a diagram of various embodiments of accessory stations in accordance with the present invention.

In addition to the fishing rod receptacle 32, as shown in FIG. 4b, the accessory stations 16 may comprise a cup holder 31 for holding a beverage while fishing; a bait tray 33 for cutting or temporarily storing bait; an aperture adapted to receive pliers 35; a small down-rigger for controlled depth fishing 37; or any other accessory or accessory holder. Additionally the accessory stations 16, including the fishing rod receptacle 32 described, may adjustably or fixedly attach to the transverse member 26 by any mechanism device, or mechanical fastener.

The present invention presents an adjustable dimension fishing accessory apparatus that provides support for multiple fishing accessories. Additionally, the fishing accessory apparatus is collapsible thereby allowing a user to move the accessory support from a collapsed position to an operational position.

The foregoing was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A fishing accessory apparatus, comprising:
   a base;
   a brace defining an adjustable aperture and including a fastener adapted to engage a structure auxiliary to said fishing accessory apparatus that becomes positioned within said aperture, said brace positioned substantially co-planar with a plane defined by said base; and
   a plurality of accessory stations, each including a fishing rod receptacle including an aperture for receiving a fishing rod handle, a support region for supporting a fishing rod shaft, a channel extending substantially through a thickness of said fishing rod receptacle, and at least one adjustable fastener attaching said receptacle to a transverse support positioned on an accessory support,
   wherein said accessory support collapsibly attaches to said base for movement of said accessory support from a collapsed position to an operational position substantially perpendicular to said base.

2. The fishing accessory apparatus of claim 1, wherein said base comprises a substantially rectangular frame defining a perimeter.

3. The fishing accessory apparatus of claim 2, wherein said brace further comprises at least two braces positioned within said perimeter.

4. The fishing accessory apparatus of claim 3, wherein said at least two braces are positioned in a substantially opposed relationship.

5. The fishing accessory apparatus of claim 1, wherein said plurality of accessory stations comprise said plurality of fishing rod receptacles positioned atop said transverse support on said accessory support.

6. The fishing accessory apparatus of claim 1, wherein said base includes first and second generally opposed members that each include a portion extending beyond a point of intersection of said accessory support with said base.

7. The fishing accessory apparatus of claim 1, wherein said accessory support attaches to said base via at least one hinge.

8. The fishing accessory apparatus of claim 1, wherein said accessory stations comprise a plurality of fishing rod receptacles that support a fishing rod in such a way that said fishing rod does not directly contact the accessory support nor the base.

9. A fishing accessory apparatus, comprising:
   a base defining a perimeter;
   a brace defining an adjustable aperture and including a fastener adapted to engage a structure auxiliary to said fishing accessory apparatus that becomes positioned within said aperture, said brace positioned within said perimeter;
   a plurality of accessory stations, each including a fishing rod receptacle including an aperture for receiving a fishing rod handle, a support region for supporting a fishing rod shaft, a channel extending substantially through a thickness of said fishing rod receptacle, and at least one adjustable fastener attaching said receptacle to a transverse support positioned on an accessory support;
   wherein said accessory support collapsibly attaches to said base for movement of said accessory support from a collapsed position to an operational position substantially perpendicular to said base.

10. The fishing accessory apparatus of claim 9, wherein said plurality of accessory stations comprise said plurality of fishing rod receptacles positioned atop said transverse support on said accessory support.

11. The fishing accessory apparatus of claim 10, wherein said plurality of fishing rod receptacles are adapted to support a fishing rod in such a way that said fishing rod does not directly contact the accessory support nor the base.

12. The fishing accessory apparatus of claim 9, wherein said brace is positioned substantially co-planar with a plane defined by said base.

13. The fishing accessory apparatus of claim 9, wherein said base is substantially rectangular and said accessory support attaches to said base via a plurality of hinges.

14. The fishing accessory apparatus of claim 9, wherein said base includes first and second generally opposed members that each include a portion extending beyond a point of intersection of said accessory support with said base.

15. The fishing accessory apparatus of claim 9, wherein said base is substantially rectangular and said brace is positioned on a first transverse member of said substantially rectangular base, and further comprising a second brace positioned on a second transverse member of said substantially rectangular base.

16. A collapsible fishing rod holder for use with a boat comprising:
   an accessory support including generally opposed first and second supports and a transverse support supporting at least one fishing rod receptacle having an aperture for receiving a fishing rod handle, a support region for supporting a fishing rod shaft, and a channel for adjustably attaching said at least one receptacle to said transverse support; and
   a base including first and second generally opposed members, and at least one transverse member, said base defining a plane and including a brace positioned in said plane, said brace defining an adjustable aperture adapted for securing said base around a pedestal of a seat on said boat, wherein said brace includes a fastener adapted to engage said pedestal and said accessory support attaches to said base via at least one hinge for movement from a collapsed position to an operational position and said first and second members extend beyond a point of intersection of said accessory support with said base, and said first and second generally opposed members, and said at least one transverse member substantially contacts a floor of said boat when said collapsible fishing rod holder is in said operational position.

17. The collapsible fishing rod holder of claim 16, wherein said first and second supports include adjusters for adjusting the lengths of said first and second supports.

18. The collapsible fishing rod holder of claim 17, wherein said first and second members include adjusters for adjusting the lengths of said first and second members.

19. The collapsible fishing rod holder of claim 16, wherein said at least one fishing rod receptacle adjustably attaches to said transverse support via a bolt extending through said channel and a corresponding nut secures said bolt.

* * * * *